(12) United States Patent
Islam et al.

(10) Patent No.: US 11,239,717 B2
(45) Date of Patent: Feb. 1, 2022

(54) AC MACHINE WINDINGS

(71) Applicant: North Carolina State University, Raleigh, NC (US)

(72) Inventors: Md Sariful Islam, Raleigh, NC (US); Md Ashfanoor Kabir, Raleigh, NC (US); Iqbal Husain, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 220 days.

(21) Appl. No.: 16/438,237

(22) Filed: Jun. 11, 2019

(65) Prior Publication Data
US 2019/0379251 A1 Dec. 12, 2019

Related U.S. Application Data

(60) Provisional application No. 62/683,384, filed on Jun. 11, 2018.

(51) Int. Cl.
| | |
|---|---|
| *H02K 3/12* | (2006.01) |
| *H02K 3/48* | (2006.01) |
| *H02K 1/16* | (2006.01) |

(52) U.S. Cl.
CPC .............. *H02K 3/12* (2013.01); *H02K 1/16* (2013.01); *H02K 3/48* (2013.01)

(58) Field of Classification Search
CPC .. H02K 1/16; H02K 3/12; H02K 3/28; H02K 3/48; H02K 1/14; H02K 1/27; H02K 17/16; H02K 21/00
See application file for complete search history.

(56) References Cited

U.S. PATENT DOCUMENTS

| | | | |
|---|---|---|---|
| 5,686,774 A | * 11/1997 | Slavik | H02K 3/28 310/198 |
| 8,536,754 B2 | 9/2013 | Dajaku | |
| 2006/0208595 A1 | 9/2006 | Bradfield | |
| 2014/0125186 A1 | * 5/2014 | Takahashi | H02K 3/28 310/202 |
| 2016/0308415 A1 | * 10/2016 | Dajaku | H02K 29/03 |
| 2018/0034335 A1 | 2/2018 | Neet et al. | |

* cited by examiner

*Primary Examiner* — Tran N Nguyen
*Assistant Examiner* — Leda T Pham
(74) *Attorney, Agent, or Firm* — Thomas Horstemeyer, LLP (57) ABSTRACT

Various examples related to shifted fractional pitch wye-delta multilayer windings and their use in AC machines. In one example, a winding includes a first wye-delta winding with first wye and delta windings for each phase and a second wye-delta winding with second wye and delta windings for each phase. The first and second wye windings for each phase are connected in series and the first and second delta windings are connected in series, and formed wye and delta windings are connected in a wye-delta configuration thereby providing an electrical phase shift between the two windings. The windings are interdigitated to provide a physical shift between the first and second wye windings and the first and second delta windings. Such windings can be used in, e.g., permanent magnet synchronous machines, synchronous machines, reluctance machines, and induction machines.

20 Claims, 9 Drawing Sheets

DESIGN SPECIFICATIONS

| Parameters | Value |
| --- | --- |
| Outer Diameter, $D_{out}$ | 100 mm |
| Axial Length, $L_{stk}$ | 100 mm |
| Number of poles, $P$ | 10 |
| DC Link Voltage, $V_{dc}$ | 48 V |
| Speed, $\omega_{rated}$ | 600 rpm |
| Power | 1 kW |
| $I_{rated}$ (rms) | 18 A |

RATED PERFORMACNE COMPARISON

| Parameters | Conventional | Proposed | [4] | [9] |
|---|---|---|---|---|
| $T_{AVG}$ (Nm) | 12.95 | 13.10 | 13.43 | 12.75 |
| $T_{Ripple}$ (%) | 5.30 | 1.60 | 2.50 | 1.25 |
| $THD_{V_{LL}}$ (%) | 4.60 | 1.10 | 2.70 | 1.63 |
| $P_{core}$ | 4.35 | 3.71 | 4.22 | 3.89 |
| $I^2R$ | 128.4 | 129.8 | 129.8 | 128.4 |
| Power factor | 0.90 | 0.96 | 0.89 | 0.95 |
| Harmonic in $\Delta$ winding | 0 | 1.60 | 1.52 | 0 |

AC MACHINE WINDINGS

CROSS REFERENCE TO RELATED APPLICATIONS

This application claims priority to, and the benefit of, U.S. provisional application entitled "AC Machine Windings" having Ser. No. 62/683,384, filed Jun. 11, 2018, which is hereby incorporated by reference in its entirety.

STATEMENT REGARDING FEDERALLY SPONSORED RESEARCH OR DEVELOPMENT

This invention was made with government support under grant number 0812121 awarded by the National Science Foundation. The government has certain rights in the invention.

BACKGROUND

Alternating current (AC) electric machines have multi-teeth stators that house the phase windings of the AC machine in stator slots, where the number of stator slots equals the number of stator teeth. The most common type of electric motor is a three-phase type. Conventional AC windings of commercial machines can be fully-pitched or chorded type. An alternative winding is the concentrated wound design that have lower end-winding length and low stator conductor loss, but they introduce large unwanted space harmonics in the air-gap magneto motive force (MMF) resulting in large iron loss, low power factor, and large torque ripple.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Permanent Magnet Synchronous Machines (PMSMs) exhibit high torque-density, high power-density and high efficiency because of high-energy permanent magnets in the rotor. Commonly used winding configurations in PMSMs are distributed overlapping winding and non-overlapping concentrated winding. Single and double layer tooth concentrated windings in permanent magnet (PM) synchronous motors are gaining interest due to the advantages of high power-density, high efficiency, shorter end winding length, high slot fill factor, low cogging torque, good fault tolerance, and zero mutual coupling between phases. However, due to the low slot/pole/phase, the magnetic field of these windings has more space harmonics including subharmonic components that rotate asynchronously with the rotor and create eddy current losses in the permanent magnet and rotor iron core. The excessive heating in the permanent magnet may lead to undesirable PM demagnetization. Moreover, these unwanted harmonics lead to the undesirable effects of localized iron core saturation, noise, and vibration.

The performance of fractional slot concentrated wound (FSCW) windings may be improved by reducing the eddy current loss through the minimization of space harmonic contents of stator MMF. Going from single layer to double layer and double layer to four-layer result in substantial reduction of subharmonics for this type of winding. Multi-layer tooth concentrated windings can be used to reduce only the subharmonics of stator MMF. A stator flux barrier in a specific location of back yoke can be designed to reduce the sub-harmonics. In these implementations, the reduction of sub-harmonics comes at a cost of 3-4% reduction of average torque. A combined Y-Δ winding in double layer fractional slot concentrated winding shows that this combination can effectively cancel the sub-harmonics while increasing the torque-producing component by 3.5%. However, the higher order harmonics still exist in the MMF spectrum which causes undesirable rotor losses, noise, and vibration. A 24-slot/10-pole winding configuration has been proposed to reduce higher order harmonics where they have created two-sets of series windings while arranging them with a mechanical phase shift. An uneven turns number for neighboring phase coils can be employed to reduce the subharmonics. However, the sub-harmonic may not be reduced to zero and at the same time, the fundamental winding factor may be reduced by 2-3%. A six-phase machine was designed where two sets of three phase windings are created, which are mechanically shifted in space, and a time domain shift can also be created using two three phase inverters. However, the effect on rotor loss, and the increment in system cost with higher phase numbers was not considered.

Disclosed herein are various examples related to shifted fractional pitch wye-delta multilayer windings and their use in AC machines such as, but not limited to, permanent magnet synchronous machines, synchronous machines, reluctance machines, and induction machines for both radial and axial flux topologies having both inner and outer rotor configurations. The disclosed winding configurations can be applied to three-phase machines, but is equally applicable to other multi-phase designs (e.g., five or nine phases). The disclosed alternative winding configuration exhibits the positive features of concentrated windings having short end winding length, compact features, reduced stator conduction loss, and easier assembly. Moreover, it can eliminate the problematic space harmonics from its stator MMF minimizing core loss, unwanted core saturation, magnet losses, noise and vibration, and torque ripple, enhancing the torque-producing component, efficiency, and power factor.

In this winding configuration, the number of stator slots is doubled compared to a fractional slot concentrated wound (FSCW) design. For example, for a 12-slot/10-pole FSCW design, the slot pole combination for the proposed winding will be 24-slot/10-pole. Doubling the slot number helps in shifting the slot harmonics to higher order, which will help in minimizing torque ripple. The disclosed concept, with twice the number of slots, forms two double-layer wye-delta windings. Any specific unwanted space harmonics, ν can be canceled by selecting the relative shifting angle ($\theta_{sh}$ electrical) between these coil groups to be $\nu^*\theta_{sh}=\pi$ or $3\pi$. As a result, the dominant space harmonics will be canceled in this double layer winding.

Windings from other phases will be shifted by 120 electrical degrees, similar to any conventional windings. Moreover, sharing the wye-delta configuration between these double layer windings can eliminate the 1st sub-harmonics and enhances its torque-producing component. As a result, having this shifted Y-Δ winding configuration produces a clean MMF spectrum with an enhanced torque-producing winding factor, and with shorter end winding length, compact structure, that helps the overall machine performance in terms of improving torque density, efficiency, and power factor, while reducing core losses, torque ripple, and conductor losses. This shifted Y-Δ winding concept is applicable for both double and multilayer wound electric machine topologies including but not limited to the permanent magnet synchronous machine, synchronous machine, reluctance machine, induction machine for both radial and axial flux topologies having both inner and outer rotor configuration. This concept is equally applicable for both fractional slots concentrated windings and distributed windings.

The disclosed shifted Y-Δ winding configuration can yield near sinusoidal air-gap MMF, which can reduce machine leakage inductance and improve machine power factor. By yielding lower harmonic contents in the stator MMF, machine core loss can be reduced and efficiency improved. The effective cancellation of space harmonics can substantially reduce the magnetic eddy loss. With a more sinusoidal MMF, machine torque ripple, vibration and noise can be substantially reduced. By doubling the number of stator slots, the effective cogging torque can be reduced by 50%. In addition, higher torque densities can be achieved under the same stator conductor loss or a cooler machine operation is possible with the same rated power. Motor applications include traction motors, motors for automotive applications, servo motors for robotics, or other high performance applications that require low ripple, high efficiency, and high torque density.

In this disclosure, a double layer winding is presented to simultaneously cancel both the sub-harmonics and the dominant higher order harmonics. A combined Y-Δ winding is applied to the widely used 12-slot/10-pole configuration. Two sets of windings are created using this Y-Δ concept and the windings are space shifted with respect to each other by a particular mechanical angle depending on their slot pole combination. The effective number of slots for the resultant stator is doubled compared to the original machine. The fundamental winding factor is increased compared to the conventional double layer winding while higher order harmonics are substantially reduced. The disclosed winding is applicable to the machines where the stator slot number Q is a multiple of twelve (Q=12*n, where n is an integer number). The concept is equally suitable to reluctance machines, induction machines, and permanent magnet machines having either distributed or concentrated windings. Moreover, the common mode voltage problem in inverter fed electric machine can also be reduced using the proposed winding concept. Additionally, a single three-phase inverter can be used to energize the winding.

Conventional Double Layer (DL) FSCW

Figure 1A:
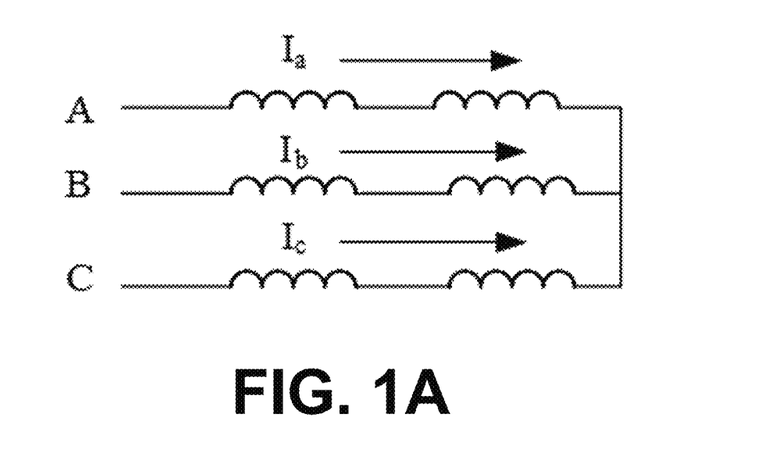
FIGS. 1A and 1B illustrate an example of the connection and arrangement, respectively, of a 12-slot/10-pole winding, in accordance with various embodiments of the present disclosure.
Figure 1B:
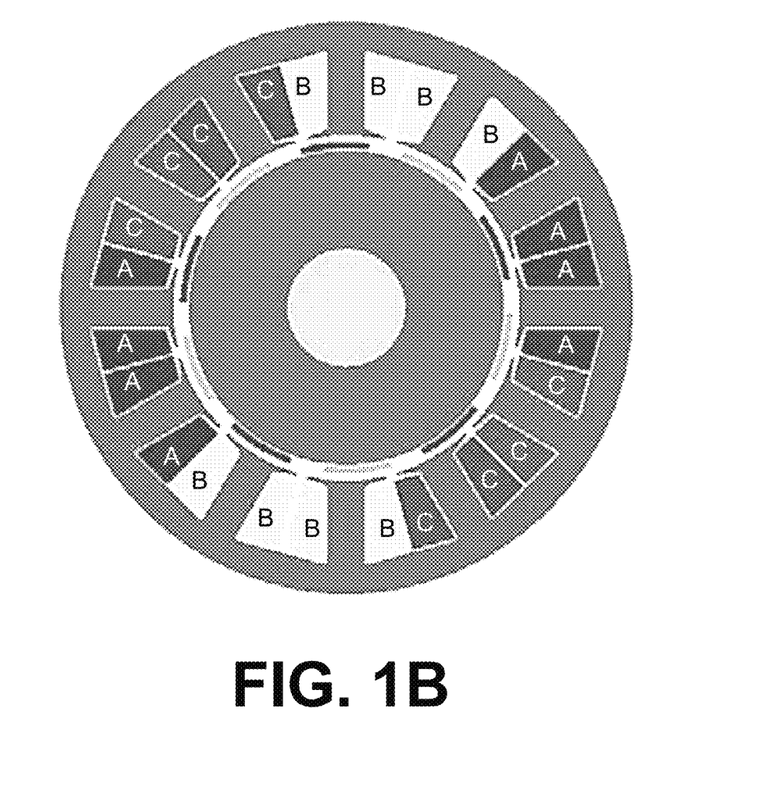
Figure 2A:
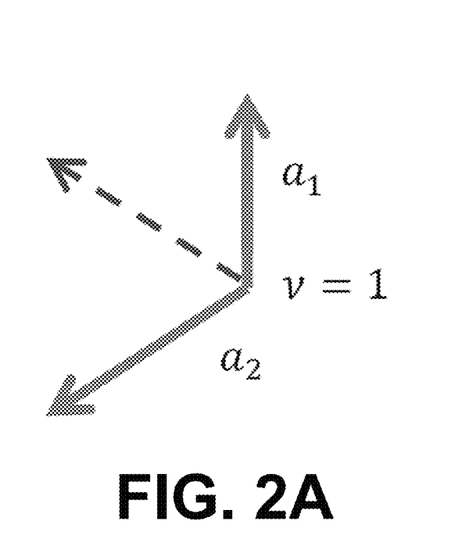
FIGS. 2A and 2B illustrate examples of MMF vector diagrams for the 12-slot/10-pole winding of FIGS. 1A and 1B, in accordance with various embodiments of the present disclosure.
Figure 2B:
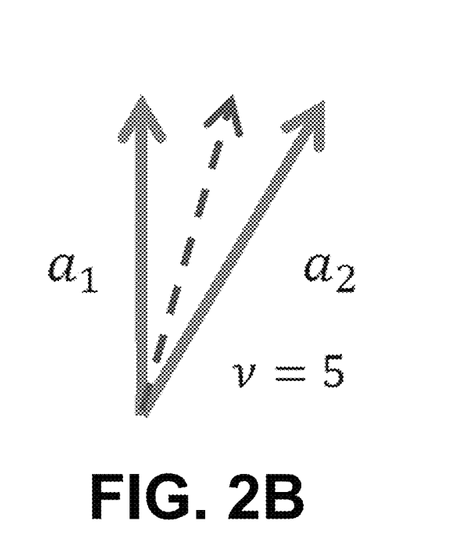

The air-gap MMF of a DL FSCW contains sub-harmonics as well as higher order space harmonics (super harmonics) in addition to the main torque-producing component. If P and Q are the pole number and slot number, respectively, then the MMF spectrum contains the first and (k·Q±P/2) space harmonics where k is an integer number. The conventional DL FSCW for a 12-slot/10-pole winding is shown in FIGS. 1A and 1B. Two non-adjacent series coils are represented by a single coil in FIG. 1A. Assuming that $a_1$ and $a_2$ are the spatial MMF axes of neighboring coils, the MMF vector diagrams for a sub-harmonic (ν=1) and torque-producing component (ν=5) are shown in FIGS. 2A and 2B, respectively. The resultant space sub-harmonic is 35.2% of the fundamental component. The air-gap MMF distribution (Y-Y) can be expressed as $$MMF_{YY} = \sum_{\nu=1,-5,7}^{\infty} \frac{12NI}{\nu\pi} \sin\left(\frac{\nu\pi}{12}\right)^2 \sin\left(\nu\theta - \omega t - \frac{\nu\pi}{12}\right). \quad (1)$$

Figure 2C:
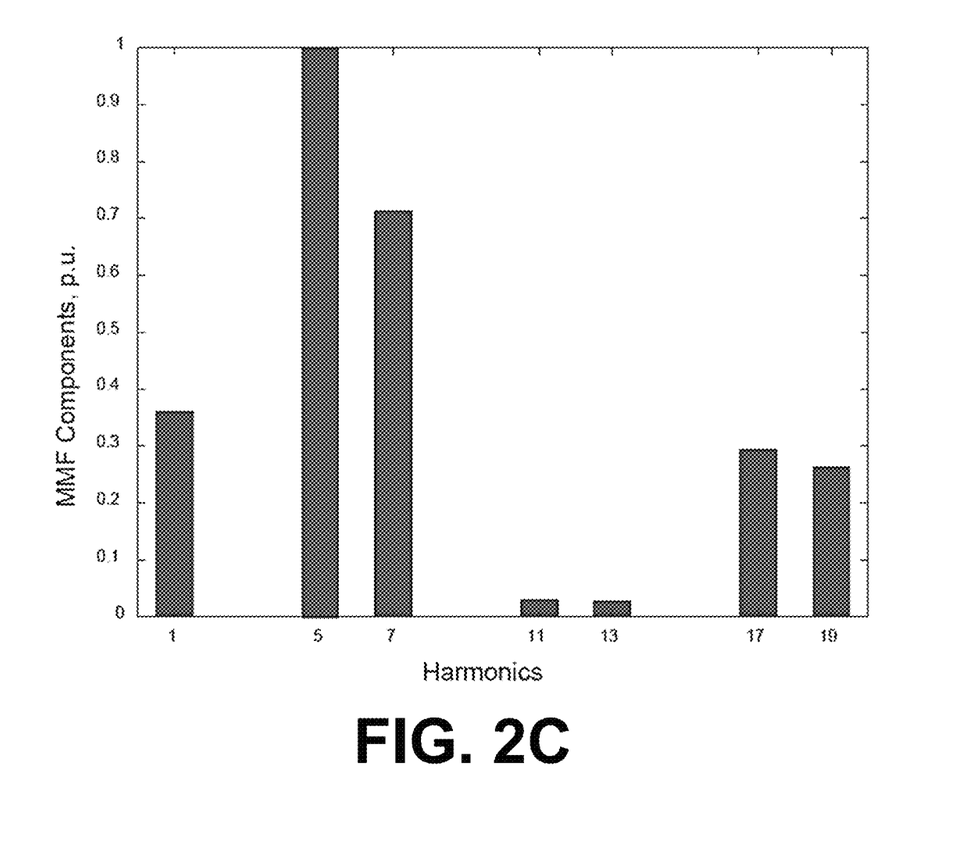
FIG. 2C illustrate an example of the harmonic spectrum of the 12-slot/10-pole winding of FIGS. 1A and 1B, in accordance with various embodiments of the present disclosure.

Here, N is the turn number, I is the current, ν is the harmonic order, θ is the space angle and ω is the angular frequency. The corresponding harmonics spectrum is shown in FIG. 2C. For a 10-pole motor the 5th order harmonic (ν=5) is the main torque producing harmonic. The other space MMF harmonics, particularly 1st (ν=1), 7th, 17th, and 19th have larger magnitudes and create undesirable effects such as core loss, core saturation, and torque ripple, as well as noise and vibration.

New Winding Concept

Among different slot/pole combinations, 12-slot (Q)/10-pole (P) has shown potential over other slot/pole configurations for different applications. The effectiveness of the disclosed winding concept is analyzed for a 12-slot/10-pole machine. The angular difference between the MMF of adjacent coils is 150° (180°−ν·2π/Q) for sub-harmonic ν=1 and 30° (180°−ν2π/Q) for ν=5 as shown in FIGS. 2A and 2B for the conventional DL winding.

Figure 3A:
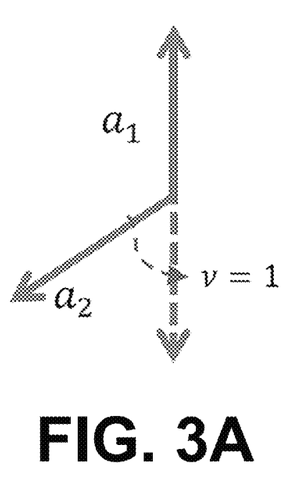
FIGS. 3A and 3B illustrate examples of MMF vector diagrams for a Y-Δ winding, in accordance with various embodiments of the present disclosure.
Figure 3B:
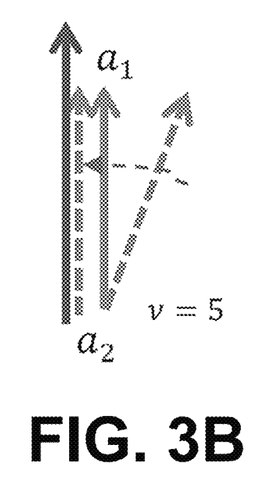

It is possible to cancel out the sub-harmonic (ν=1) by shifting the MMF of one coil group by +ν·2π/Q (30°) which also yields a 3.5% increment in torque-producing component (ν=5) as illustrated by the Y-Δ winding MMF vector diagrams in FIGS. 3A and 3B. In this proposed method, the two coil groups are connected in a Y-Δ configuration to avail the advantage of the 30° phase shift which is needed to cancel the sub-harmonic (ν=1). This connection also yields a current ratio of between the coil groups. Hence, for maintaining the MMF balance, the number of turns in the delta-coil should be maintained as $\sqrt{3}$ times that of the wye-coil. The area of each conductor is balanced by appropriate conductor size considering the effective current ratio.

Figure 4A:
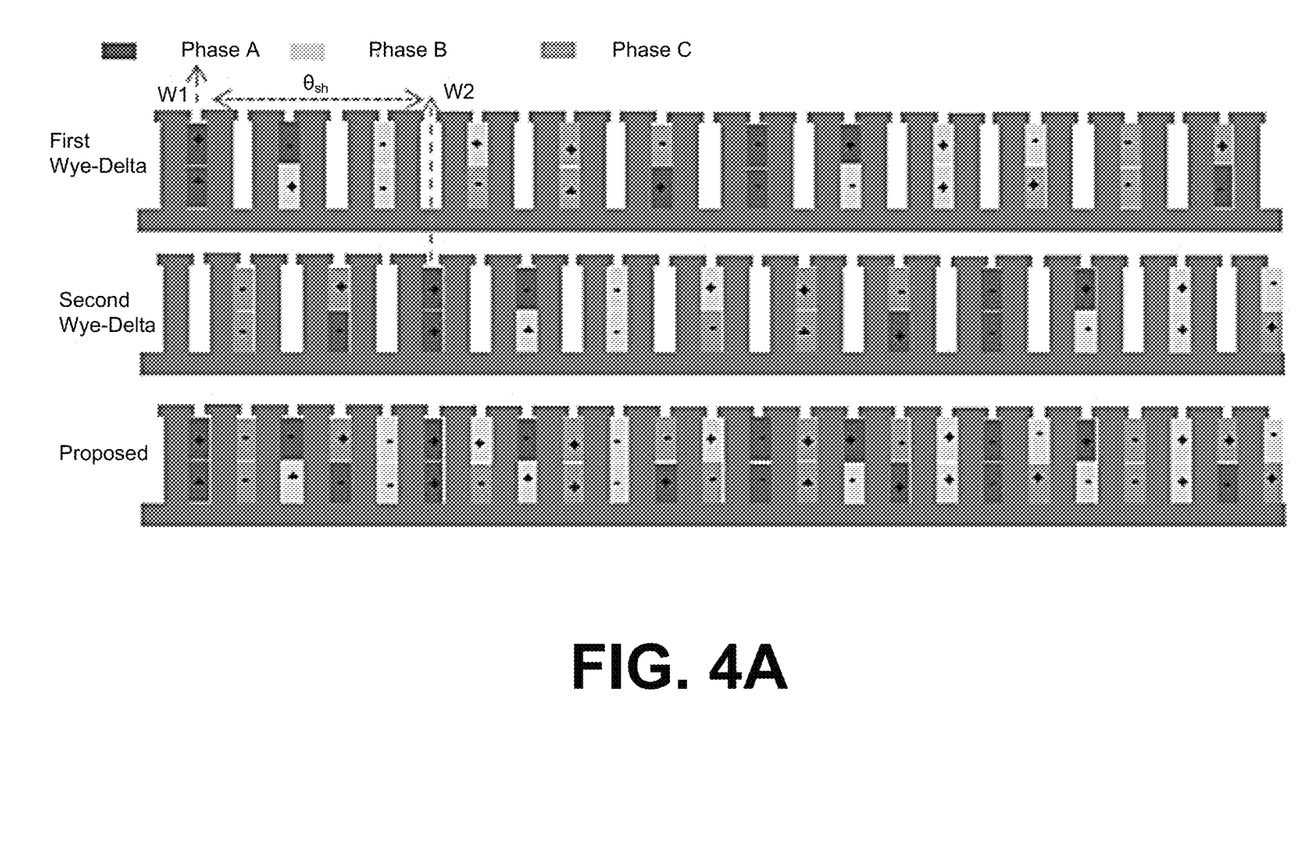
FIGS. 4A and 4B illustrate examples of a winding distribution and connection, respectively, of the proposed winding concept, in accordance with various embodiments of the present disclosure.
Figure 4B:
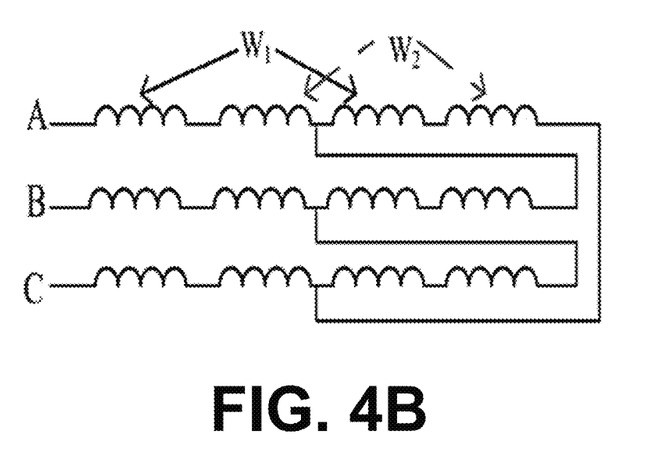

Two sets ($W_1$, $W_2$) of three phase Y-Δ windings are created and distributed, as presented in FIG. 4A. The windings are shifted by $\theta_{sh}$ in space as shown in FIG. 4A and connected in series as illustrated in FIG. 4B. The resultant stator design has twice the number of slots (24-slot/10-pole) compared to conventional concentrated wound design (12-slot/10-pole). The air-gap MMF for both winding sets $W_1$ and $W_2$ can be calculated using the Fourier series expansion of MMF distribution as:

$$MMF_{Y,W1} = \sum_{v=1,-5,7,...}^{\infty} \frac{6N_Y I_Y}{v\pi} \sin(v\pi/12)\cos(v\theta - \omega t); \quad (2)$$

$$MMF_{\Delta,W1} = -\sum_{v=1,-5,7,...}^{\infty} \frac{6N_\Delta I_\Delta}{v\pi} \sin(v\pi/12)\cos\left(v\left(\theta - \frac{\pi}{6}\right) - \left(\omega t - \frac{\pi}{6}\right)\right). \quad (3)$$

$$MMF_{W1} = Eqn.\ 2 + Eqn.\ 3$$

$$= \sum_{v=1,-5,7,...}^{\infty} \frac{12NI}{v\pi} \sin\left(\frac{v\pi}{12}\right) \sin((v-1)\pi/12) \sin\left(v\theta - \omega t - \frac{(v-1)\pi}{12}\right); \quad (4)$$

$$MMF_{W2} = \quad (5)$$
$$\sum_{v=1,-5,7,...}^{\infty} \frac{12NI}{v\pi} \sin\left(\frac{v\pi}{12}\right) \sin((v-1)\pi/12) \sin\left(v\theta - \omega t - \frac{(v-1)\pi}{12} - v\theta_{sh}\right);$$

The total airgap *MMF* distribution is given by:

$$MMF_T = \sum_{v=1,-5,7,...}^{\infty} \frac{24NI}{v\pi} \sin\left(\frac{v\pi}{12}\right) \sin((v-1)\pi/12) \quad (6)$$
$$\cos(v\theta_{sh}/2)\sin\left(v\theta - \omega t - \frac{(v-1)\pi}{12} - v\theta_{sh}/2\right).$$

Figure 5:
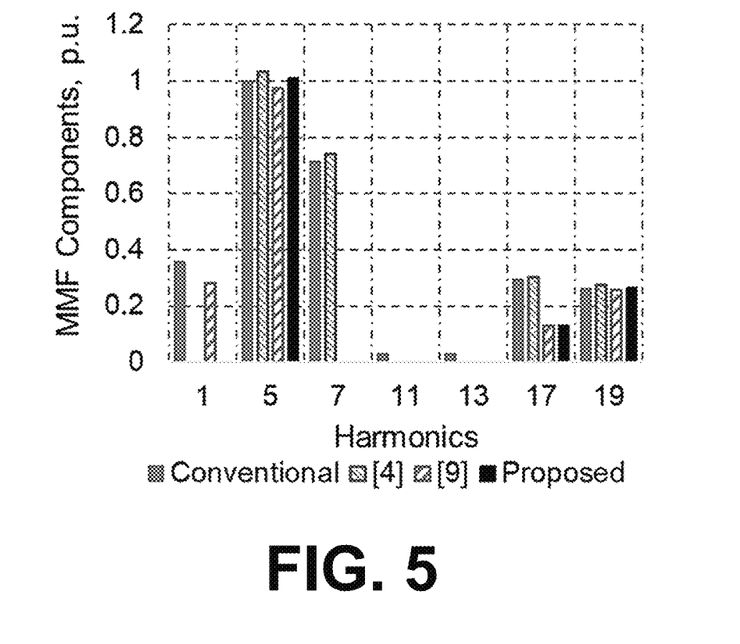
FIG. 5 illustrates a comparison of the MMF spectrum of the proposed winding concept with other winding configurations, in accordance with various embodiments of the present disclosure.

It is evident from Eqn. (6) that ν=1 makes the MMF sub-harmonics zero. Moreover, to cancel one particular higher order harmonic $\cos(v\theta_{sh}/2)$ needs to be equal to zero or $\theta_{sh}=\pi/v$ or $\theta_{sh}=3\pi/v$ in Eqn. (6). For 12-slot/10-pole with conventionally wound design, the 7th space harmonic is the dominant higher order harmonic and it is 71% of torque-producing (5th) component as shown in FIG. 2C. To cancel 7th space harmonic, the $\cos(7\theta_{sh}/2)$ term in Eqn. (6) has to be zero and this is possible by selecting $\theta_{sh}=77.15°=5.15\alpha_s$, where $\alpha_s$ represents the slot pitch of the resultant stator. MMF harmonic spectrums for a conventional DL winding; Y-Δ DL winding of [4] "Low Space Harmonics Cancelation in Double-Layer Fractional Slot Winding Using Dual Multiphase Winding" by A. S. Abdel-Khalik et al. (IEEE Transactions on Magnetics, vol. 51, no. 5, pp. 1-10, May 2015), which is hereby incorporated by reference in its entirety; DL phase-shift winding of [9] "A Novel 24-Slots/10-Poles Winding Topology for Electric Machines" by G. Dajaku et al. (2011 IEEE International Electric Machines & Drives Conference (IEMDC), Niagara Falls, ON, 2011, pp 65-70), which is hereby incorporated by reference in its entirety; and the proposed windings are shown in FIG. 5. It is noted that the proposed concept provides a cleaner MMF spectrum. The Y-Δ winding in [4] can effectively cancel the sub-harmonic (ν=1) but it still has 7th, 17th, and 19th harmonics in its spectrum. The results in [8] "A novel 12-teeth/10-poles PM machine with flux barriers in stator yoke" by G. Dajaku, et al. (2012 XXth International Conference on Electrical Machines, Marseille, 2012, pp. 36-40), which is hereby incorporated by reference in its entirety, show that the phase-shift winding can cancel the 7th harmonic, but it still has substantial sub-harmonic.

In comparison, it is shown that the main unwanted sub-harmonic and 7th harmonic are completely cancelled by the proposed winding concept. Moreover, the 17th harmonic is also reduced by more than 50%. Additionally, the main torque-producing component is increased by 1%, which lends to an increase in torque density of the machine. Moreover, the new winding disclosed here is expected to have the same equivalent phase resistance as the conventional double layer concentrated wound (DLCW) winding. The equivalent resistance of the wye-coil in each phase can be calculated using:

$$R_{Y,proposed} = \frac{\rho L}{A_{Slot} \cdot F} N^2 \cdot \frac{Q_{proposed}}{m}. \quad (7)$$

Figure 6A:
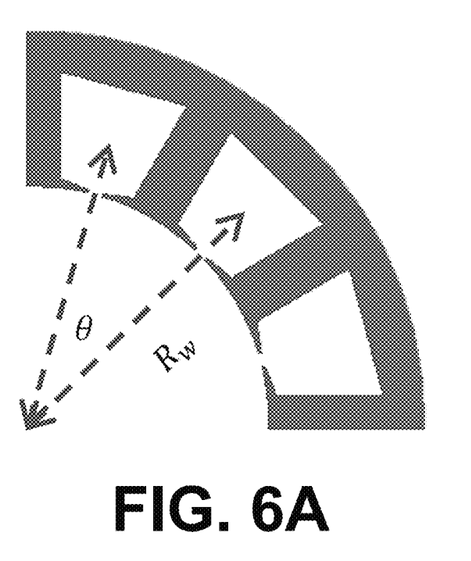
FIGS. 6A and 6B illustrate the coil span for a double layer concentrated wound (DLCW) winding and the proposed winding, in accordance with various embodiments of the present disclosure.
Figure 6B:
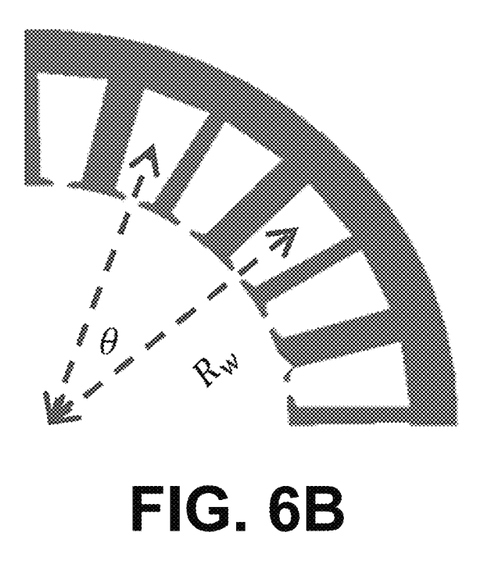

The equivalent resistance of the delta-coil group is calculated using:

$$R_{\Delta,Proposed} = 3R_{Y,Proposed}. \quad (8)$$

where, $L=L_{stack}+L_{end}$, $Q_{proposed}$=slot number, m=phase number, N is the turns number, $A_{slot}$ is the total area of slot, ρ is the material resistivity at the operating temperature, F is the fill factor. The end winding length of the proposed winding are the same as that of the conventional double layer concentrated winding because of same angular span of the coil as illustrated in FIGS. 6A (conventional DL) and 6B (proposed). The end winding length can be calculated using the following:

$$L_{end} = 0.93 \frac{2\pi R_w}{Q}. \quad (9)$$

Here, $R_W$ is the average slot radius, Q is the total number of slots. The resistance of the delta coil is 3 times that of the wye coil because it has $\sqrt{3}$ times the turns compared to the wye coil. The total stator copper loss in the proposed winding and conventional winding will be the same for the fundamental excitation frequency as the total copper volume, and the rated current is the same. However, there will be an additional loss in the delta winding due to the 3rd order harmonic in delta coil's current. This loss can be reduced by proper design of the rotor of the permanent magnet machines.

Performance Analysis

Figure 7:
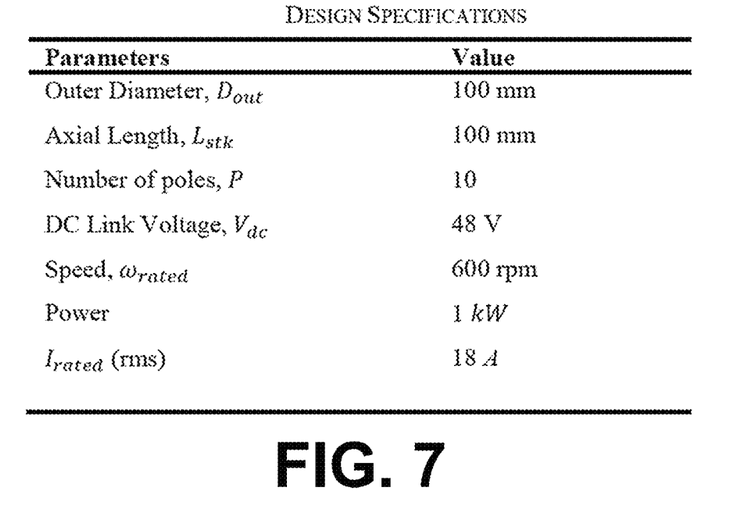
FIG. 7 is a table illustrating an example of design specifications for evaluation of the proposed winding concept, in accordance with various embodiments of the present disclosure.

Four different PM machines, namely, (a) a conventional DL wound 12-slot/10-pole, (b) DL Y-Δ winding with 12-slot/10-pole [4], (c) DL phase-shifted winding with 24-slot/10-pole [9], and (d) the proposed 24-slot/10-pole windings were designed. All the PM machines were designed under the constraints of the same magnet volume, rotor dimension, outer diameter, copper volume, and phase current. The parameters for the designed machines are given in the table of FIG. 7.

Figure 8A:
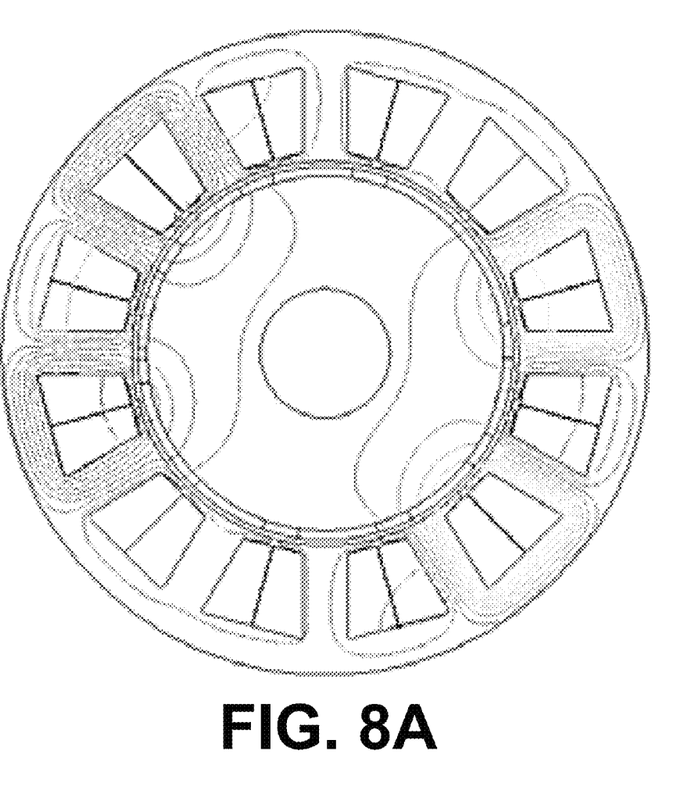
FIGS. 8A and 8B illustrate armature reaction flux lines in a core for the DLCW and proposed windings (determined using FEA), in accordance with various embodiments of the present disclosure.
Figure 8B:
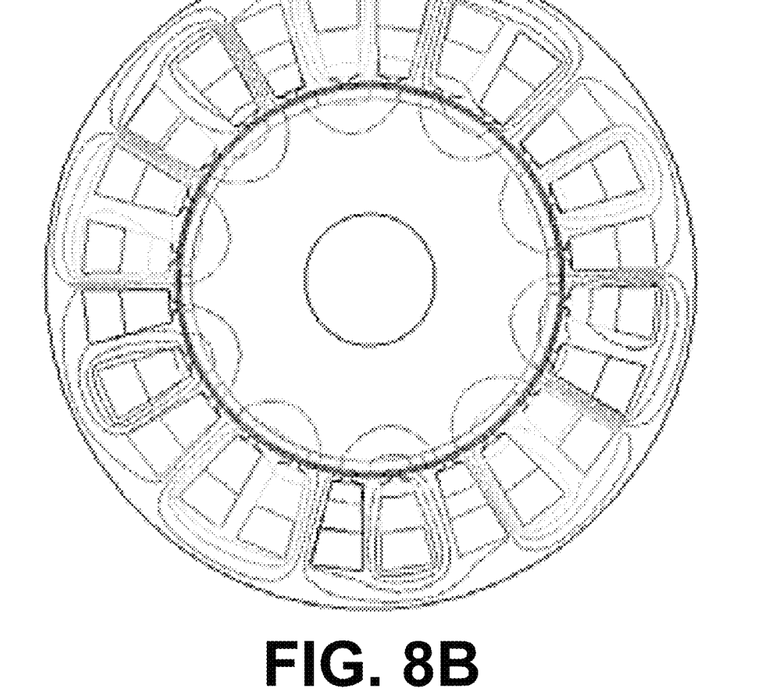
Figure 9A:
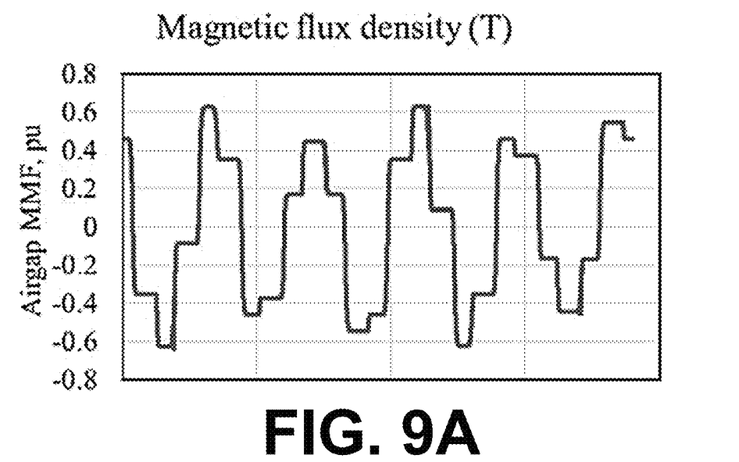
FIG. 9A illustrates an example of the MMF distribution in an airgap of a 24-slot/10-pole machine using the proposed winding concept, in accordance with various embodiments of the present disclosure.
Figure 9B:
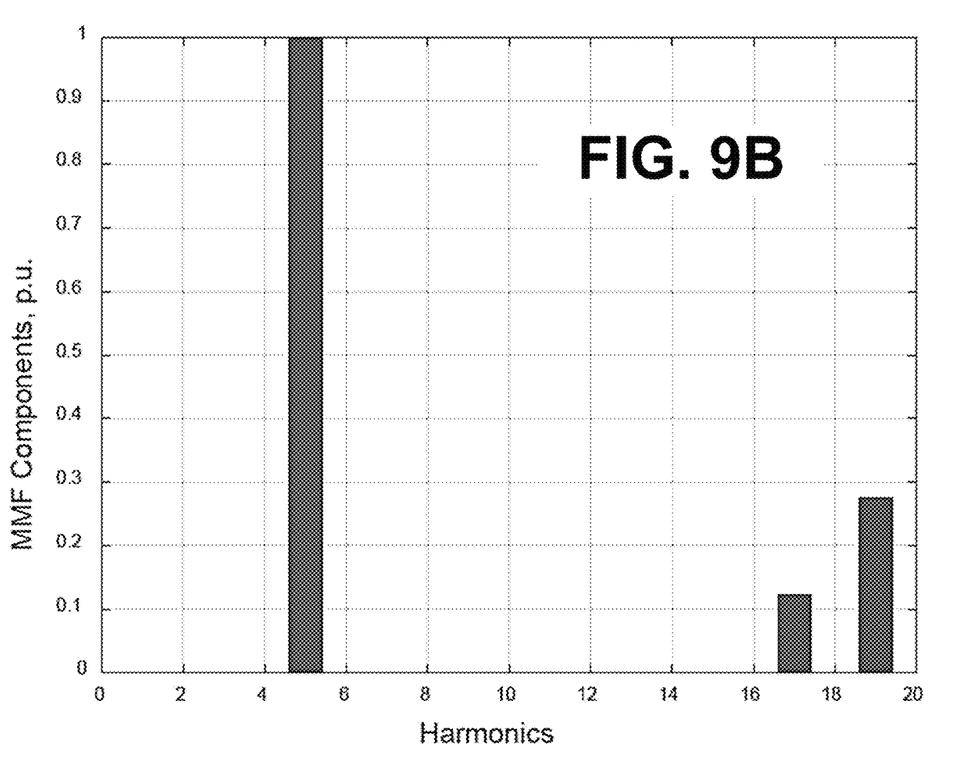
FIG. 9B illustrates an example of the harmonic spectrum of the 24-slot/10-pole machine using the proposed winding concept, in accordance with various embodiments of the present disclosure.

To prove the proposed concept, the air-gap flux density due to stator excitation was derived using 2D finite element analysis (FEA) for the 24-slot/10-pole machine. A solid rotor was used to avoid rotor contribution to the airgap MMF. The flux path due to armature reaction is shown in FIGS. 8A and 8B. Moreover, the flux lines crossing the rotor indicates the presence of high amplitude sub-harmonics as in FIG. 8A and the absence of rotor crossing flux lines in FIG. 8B indicates that the proposed winding can successfully cancel the high amplitude subharmonics. The airgap MMF of the proposed winding with its corresponding spectrum are presented in FIGS. 9A and 9B. FIG. 9A plots the MMF distribution about the airgap of the proposed 24-slot/10-pole machine and FIG. 9B shows the harmonic spectrum. FEA results in FIGS. 9A and 9B validate the analytical proposition of $\theta_{sh}=77.15°$ for the new Y-Δ winding for the 24-slot/10-pole motor. It is evident that 1st and 7th harmonics become zero and 17th harmonic is also substantially reduced which matches with the analytical model. The cancellation of the sub and super harmonics are expected to reduce the torque ripple, noise and vibration, core loss, and demagnetization of PM.

Figure 10:
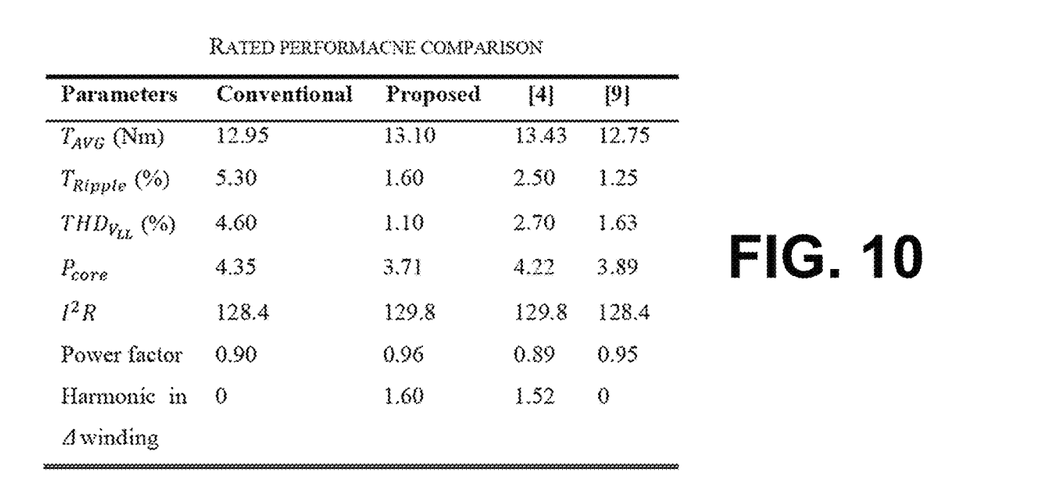
FIG. 10 is a table illustrating a comparison of rated performance of the 24-slot/10-pole machine using the proposed winding concept with machines using other winding configurations, in accordance with various embodiments of the present disclosure.
Figure 11A:
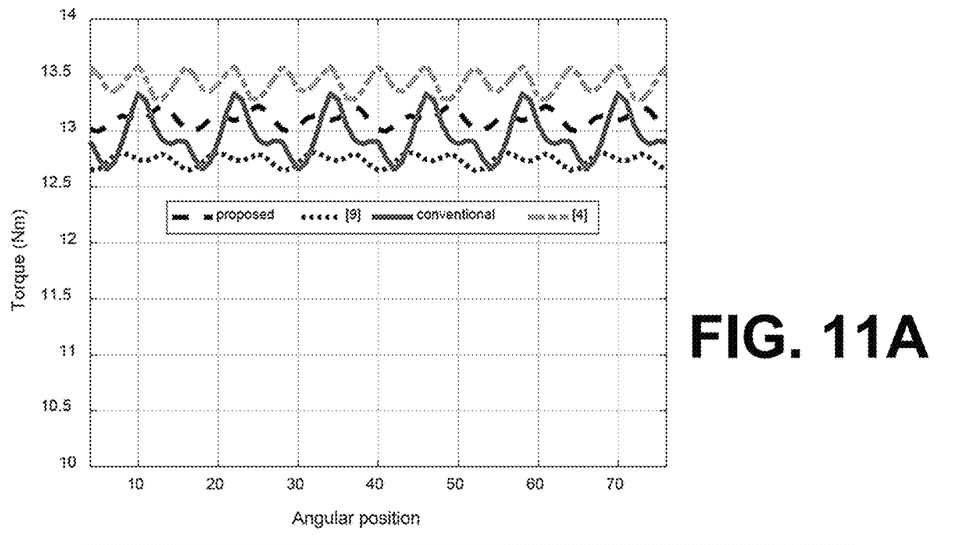
FIGS. 11A and 11B compare torque profiles and line voltages of the 24-slot/10-pole machine using the proposed winding concept with the machines using other winding configurations (determined using FEA), in accordance with various embodiments of the present disclosure.
Figure 11B:
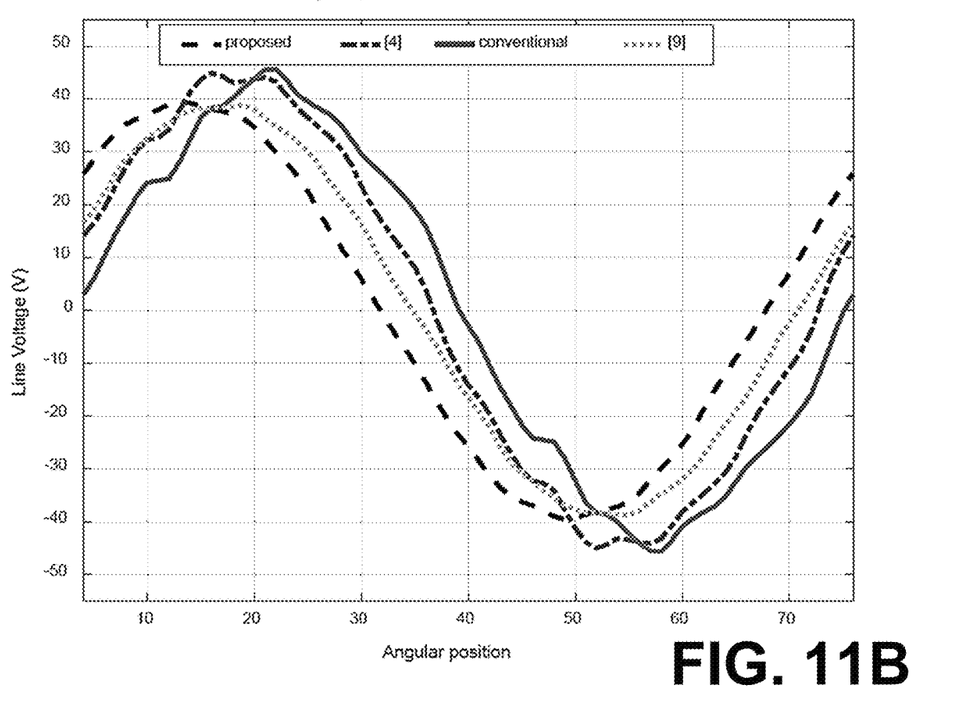

The electromagnetic performances of the proposed winding using FEA are compared with the conventional DLCW as presented by Abdel-Khalik et al. [4] and Dajaku et al. [9], and the relative advantages are shown in the table II of FIG. 10. FIGS. 11A and 11B illustrate comparisons of the torque profile and line voltages of the proposed winding configuration with other winding configurations. The electromagnetic torque profile at rated speed with rated current as in FIG. 11A shows that the average torque is 13.1 Nm compared to the 12.95 Nm of the conventional DLCW design. It also validated the analytical proposition of a torque density improvement of more than 1%. However, the optimum shifting angle was found to be 76° from the FEA for the design in comparison to the 77.15° determined for the ideal condition in mitigating the effects of rotor magnets, stator slots, and teeth saturation. Moreover, the torque ripple comes from the interaction of stator harmonics and rotor harmonics along with the cogging torque of the machines. Therefore, the ripple reduction of the presented winding is 70% due to the cancellation of both sub and super harmonics compared to the conventional DLCW. The proposed machine also achieves a very low 1.1% THD in the line voltages as in FIG. 11B compared to 4.6% THD of conventional DLCW design. In comparison with other windings, the winding of Dajaku et al. [9] achieves 76% torque ripple reduction and 1.60% THD in the line voltages at the expense of a 1.6% reduction in average torque compared to the conventional design following the optimized shifting angle to 76°. Moreover, winding of Abdel-Khalik et al. [4] achieves a reduction of 60% in torque ripple and 2.70% THD in line voltages along with 3.5% improvement in the average torque. Therefore, the proposed winding concept can achieve better torque ripple and torque density.

Similar stator copper loss is expected for all the designed machines as they have the same dimensions and copper volume. However, the introduction of 3rd harmonics in delta current may lead to increase in stator copper loss for the proposed winding. This extra loss depends on the PM design and magnetization. Moreover, the PM design can be optimized for the proposed design to keep this extra loss very eligible (1%) as in the table of FIG. 10. However, the proposed winding can reduce the total magnetic loss by substantial amount (15%) compared to the conventional DLCW. Moreover, the disclosed winding achieves the minimum core loss (3.7 W) compared to 4.22 W in Abdel-Khalik et al. [4] and 3.9 W in Dajaku et al. [9] due to the simultaneous cancellation of sub-harmonics and super harmonics. The presence of sub and super harmonics in DLCW increases the harmonic leakage inductance and hence, degrade the power factor. Therefore, the cancellation of harmonics leads to an improved power factor as shown in the table of FIG. 10. The proposed winding enhances the power factor to 0.96 compared to 0.90 of DLCW.

The proposed winding introduces the disadvantages of non-overlapping winding as the two three phase winding sets are used to cancel the higher order harmonics. There is the possibility of slightly higher end winding length compared to the conventional DLCW. Even though the cancellation of sub and super harmonics improves the core loss, torque ripple, power factor and THD performances, this proposed winding will degrade the flux weakening performance. The harmonics associated in the concentrated winding increase the harmonic leakage inductance and consequently, the direct axis inductance. The absence of sub and super harmonics reduces the direct axis inductance, and hence, increases the characteristic current ($I_{ch}=\psi_m/L_d$). The increase in characteristic current may degrade the flux weakening performance.

In this disclosure, a winding concept is proposed to cancel simultaneously both the sub and higher order harmonics of stator MMF along with an increment in the torque density. The proposed winding is based on two sets of three-phase Y-Δ winding connected in series but shifted in space with respect to each other. The winding pattern doubles the number of slots. The designed machine with the proposed winding shows a 1.25% increment in average torque, with a 1.6% torque ripple, and a 1.1% THD compared to a conventional FSCW machine (torque ripple 5.3% and THD of 4.6%). The simultaneous cancellation of sub and super harmonics increases the power factor of the new machine by 7% and improves the core loss performance compared to the DL FSCW. Most of the reported works on harmonic reduction can only reduce one particular harmonic with a sacrifice or no improvement in the average torque. However, the proposed concept has the advantage of cancelling most of the unwanted harmonics without sacrificing the torque density of the machine. Torque ripple and THD reduction without pole shaping or skewing further reduces the manufacturing complexity. The proposed concept is equally applicable to reluctance machines and induction machines with either concentrated or distributed wound stator, and can also be utilized in synchronous machines, including permanent magnet synchronous machines. The proposed concept can be used in multi-phase electrical machine with radial or axial flux topologies, and machines with inner rotor or outer rotor topologies.

A new winding concept for fractional slot concentrated winding (FSCW) has been presented that can simultaneously cancel both sub and higher order harmonics of stator MMF. The new winding concept utilizes two sets of three-phase windings by doubling the number of stator slots connected in wye-delta configuration. These two winding sets are shifted in space with respect to each other and are connected in series. The wye-delta configuration eliminates sub-harmonics and enhances the torque-producing component whereas their relative shifting angle eliminates the dominant higher order harmonics to provide a cleaner and enhanced spectrum. This concept was shown to be effective when the stator slot number is multiple of twelve, however other slot/pole combinations can be utilized (e.g., where the stator slot number is a multiple of nine). The application of the proposed winding to a PM machine demonstrated dominant sub and higher order harmonics cancellation, THD reduction, torque ripple reduction, and magnetic loss reduction along with torque density and power factor improvements.

It should be emphasized that the described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

The invention claimed is:

1. An electrical winding, comprising:
    a first wye-delta winding comprising a first wye winding and a first delta winding for each phase; and
    a second wye-delta winding comprising a second wye winding and a second delta winding for each phase;
    where the first and second wye windings for each phase are connected in series forming wye windings and the first and second delta windings are connected in series forming delta windings, and the wye and delta windings are connected in a wye-delta configuration thereby forming first and second wye-delta connected windings providing an electrical phase shift between the wye windings and the delta windings; and
    where the first and second wye-delta connected windings are interdigitated with the first wye-delta connected winding and the second wye-delta connected winding positioned in alternating slots of a core thereby providing a physical shift between the first and second wye windings and the first and second delta windings.

2. The winding of claim 1, wherein the electrical winding is a multi-phase winding.

3. The winding of claim 2, wherein the physical shift between the first and second wye windings and the first and second delta windings is $\theta_{sh}=n\pi/\nu$, where n is an odd integer (n=1, 3, 5 . . . ) and $\nu$ is an unwanted space harmonic.

4. The winding of claim 1, wherein the first and second wye-delta connected windings are installed in a number of slots in the core.

5. The winding of claim 4, wherein the number of slots in the core is twice compared to the number of slots in a conventional winding configuration.

6. The winding of claim 4, wherein the number of slots is a multiple of twelve.

7. The winding of claim 6, wherein a slot/pole combination of the first and second wye-delta connected windings is a multiple of 12 slots/10-poles.

8. The winding of claim 4, wherein the core is a stator core.

9. The winding of claim 1, wherein the first and second wye-delta connected windings are fractional slot concentrated windings or distributed windings.

10. A multi-phase electrical machine, comprising:
    a core comprising a number of slots; and
    an electrical winding installed in the number of slots of the core, the electrical winding comprising:
        a first wye-delta winding comprising a first wye winding and a first delta winding for each phase; and
        a second wye-delta winding comprising a second wye winding and a second delta winding for each phase;
        where the first and second wye windings for each phase are connected in series forming wye windings and the first and second delta windings are connected in series forming delta windings, and the wye and delta windings are connected in a wye-delta configuration thereby forming first and second wye-delta connected windings providing an electrical phase shift between the wye windings and the delta windings; and
        where the first and second wye-delta connected windings are interdigitated with the first wye-delta connected winding and the second wye-delta connected winding installed in alternating slots of the core thereby providing a physical shift between the first and second wye windings and the first and second delta windings.

11. The machine of claim 10, wherein the electrical winding is a multi-phase winding.

12. The machine of claim 11, wherein the physical shift between the first and second wye windings and the first and second delta windings is $$\theta_{sh}=\frac{n\pi}{\nu}$$

where n is an odd integer (n=1, 3, 5 . . . ) and $\nu$ is an unwanted space harmonic.

13. The machine of claim 10, wherein the number of slots in the core is twice compared to the number of slots in a conventional winding configuration.

14. The machine of claim 10, wherein the number of slots is a multiple of twelve.

15. The machine of claim 14, wherein a slot/pole combination of the first and second wye-delta connected windings is a multiple of 12 slots/10-poles.

16. The machine of claim 10, wherein the core is a stator core.

17. The machine of claim 10, wherein the first and second wye-delta connected windings are fractional slot concentrated windings or distributed windings.

18. The machine of claim 10, wherein the multi-phase electrical machine is a permanent magnet synchronous machine, a synchronous machine, a reluctance machine, or an induction machine.

19. The machine of claim 10, wherein the multi-phase electrical machine is of radial or axial flux topologies.

20. The machine of claim 10, wherein the multi-phase electrical machine is of inner rotor or outer rotor topologies.

* * * * *